United States Patent
Yoshida

(10) Patent No.: US 8,523,273 B2
(45) Date of Patent: Sep. 3, 2013

(54) VEHICLE BODY STRUCTURE

(75) Inventor: Koji Yoshida, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/141,356

(22) PCT Filed: Oct. 23, 2009

(86) PCT No.: PCT/JP2009/068253
§ 371 (c)(1),
(2), (4) Date: Jun. 22, 2011

(87) PCT Pub. No.: WO2011/048694
PCT Pub. Date: Apr. 28, 2011

(65) Prior Publication Data
US 2011/0254313 A1    Oct. 20, 2011

(51) Int. Cl.
*B60R 19/02* (2006.01)
(52) U.S. Cl.
USPC ............ 296/187.09; 296/193.09; 296/203.02; 293/132
(58) Field of Classification Search
USPC ... 296/187.09, 193.09, 203.02; 293/131–133
See application file for complete search history.

(56) References Cited

U.S. PATENT DOCUMENTS

| | | | |
|---|---|---|---|
| 3,888,502 A | | 6/1975 | Felzer et al. |
| 5,876,078 A | * | 3/1999 | Miskech et al. ............... 293/133 |
| 7,213,873 B2 | * | 5/2007 | Murata et al. ................. 296/204 |
| 2006/0255625 A1 | | 11/2006 | Kitoh et al. |
| 2007/0040414 A1 | | 2/2007 | Frederick et al. |

FOREIGN PATENT DOCUMENTS

| | | |
|---|---|---|
| DE | 10 2006 011 1 | 9/2007 |
| JP | 49 48021 | 5/1974 |
| JP | 58 105883 | 6/1983 |
| JP | 63-103770 A | 5/1988 |

(Continued)

OTHER PUBLICATIONS

International Search Report Issued Jan. 12, 2010 in PCT/JP09/068253 filed Oct. 23, 2009.

(Continued)

*Primary Examiner* — Glenn Dayoan
*Assistant Examiner* — Melissa A Black
(74) *Attorney, Agent, or Firm* — Oblon, Spivak, McClelland, Maier & Neustadt, L.L.P.

(57) ABSTRACT

Provided is a vehicle body structure which can improve collision performance. The sub-side member 3 has a deformation cooperative movement portion 7 whose strength is made lower than the deformation suppressing portion 8 on the rear side, at a position ahead of a power unit EG. The sub-side member 3 easily deforms at a position ahead of the power unit EG when the load is applied. The sub-side member 3 can deform in synchronization with the deformation of the front side member 2, in a region ahead of the power unit EG with high strength and a relatively small number of disposition parts. Accordingly, the sub-side member 3 can absorb the load efficiently in cooperative movement with the front side member 2. Additionally, the sub-side member 3 is constructed so as to have a higher strength than the deformation cooperative movement portion 7, on the rear side of the deformation cooperative movement portion 7. Accordingly, the sub-side member 3 sufficiently transmits the load to a rear frame structure structure. Thereby, the load is distributed to the front side member 2 and the sub-side member 3.

8 Claims, 10 Drawing Sheets

(56) References Cited

FOREIGN PATENT DOCUMENTS

| JP | 10 264862 | 10/1998 |
|---|---|---|
| JP | 11 348824 | 12/1999 |
| JP | 2000 344133 | 12/2000 |
| JP | 2002 114171 | 4/2002 |
| JP | 2002 127936 | 5/2002 |
| JP | 2003 146242 | 5/2003 |
| JP | 2004-345466 A | 12/2004 |
| JP | 2005 119566 | 5/2005 |
| JP | 2007 1347 | 1/2007 |
| JP | 2007-2857 A | 1/2007 |
| JP | 2007 186125 | 7/2007 |
| JP | 2007 216901 | 8/2007 |
| JP | 2008 37112 | 2/2008 |
| JP | 2009-137543 A | 6/2009 |
| JP | 2010-6154 A | 1/2010 |

OTHER PUBLICATIONS

The International Preliminary Report on Patentability issued May 18, 2012, in International application No. PCT/JP2009/068253 (English translation).

Office Action issued Jul. 17, 2012, in Japanese Patent Application No. 2011-513173.

* cited by examiner

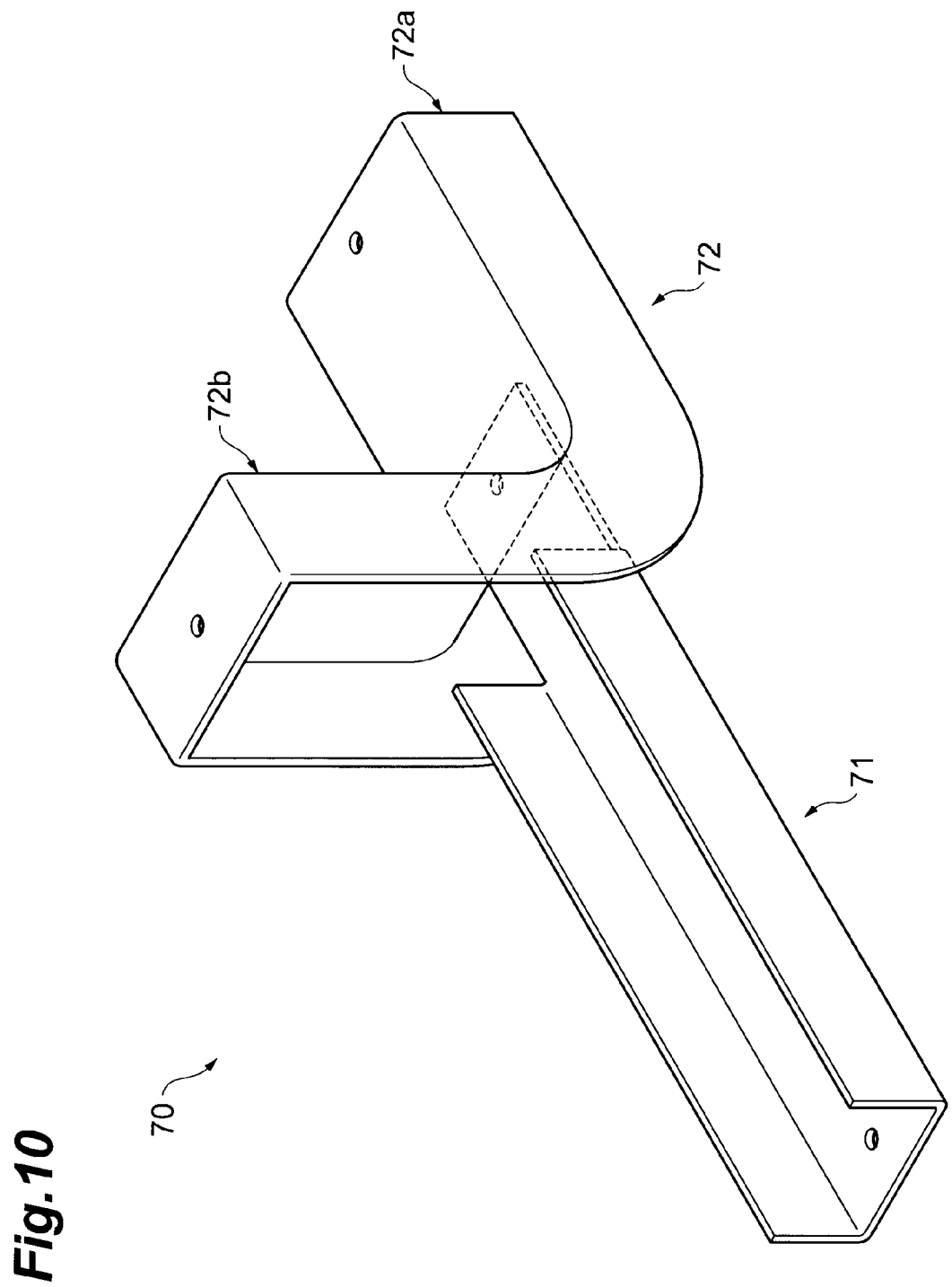

VEHICLE BODY STRUCTURE

TECHNICAL FIELD

The present invention relates to a vehicle body structure in a vehicle.

BACKGROUND ART

A vehicle body structure including a side member which extends in the front-and-rear direction of a vehicle, and a sub-side member juxtaposed to a side member is known as a conventional vehicle body structure (for example, Patent Literature 1). In this vehicle body structure, the sub-side member has a front region, a middle region, and a rear region. Additionally, the buckling strength of the rear region of the sub-side member is set to be higher than the front region, and the buckling strength of the middle region of the sub-side member is set to be higher than the rear region.

CITATION LIST

Patent Literature
 Patent Literature 1: Japanese Unexamined Patent Application Publication No. 2008-37112

SUMMARY OF INVENTION

Technical Problem

Here, in the above-described vehicle body structure, there is a demand for further improvements in collision performance. When a load is applied, specifically, deformation of the side member and deformation of the sub-side member are required to be synchronized with each other. This further improves the efficiency of load absorption. Additionally, load can be distributed to the side member and the sub-side member. Thus, there is a demand that collision performance is further improved by making a vehicle body structure into a suitable structure.

The invention has been made in order to solve such problems, and the object thereof is to provide a vehicle body structure which can improve collision performance.

Solution to Problem

A vehicle body structure of the invention includes a pair of side members which extends in the front-and-rear direction of a vehicle; a pair of sub-side members juxtaposed below the pair of side members, respectively; and a power unit arranged at a position surrounded by the pair of side members and the pair of sub-side members. Here, the sub-side member has, at a position ahead of the power unit with respect to the load, a portion whose strength is made lower than the other portions.

For example, in a conventional vehicle body structure as shown in FIG. 3, the sub-side member with constant strength along the front-and-rear direction of the vehicle folds and deforms at a middle position. On the other hand, according to the vehicle body structure related to the invention, the sub-side member has, at a position ahead of the power unit with respect to the load, a portion whose strength is made lower than the other portions. The sub-side member easily deforms at the portion on the front side whose strength is made low. That is, the sub-side member easily deforms at a position ahead of the power unit EG with respect to the load when the load is applied. The sub-side member can deform in synchronization with deformation of the side member, in a region ahead of the power unit EG with a relatively small number of disposed parts whose strength are high. Accordingly, the sub-side member can absorb the load efficiently in cooperative movement with the side member. Additionally, the sub-side member is constructed so as to have a higher strength than a portion ahead of the power unit, at the portion on the rear side with respect to the load. Accordingly, after the load is absorbed by cooperative movement on the front side of the side member and the front side of the sub-side member, the sub-side member can sufficiently transmit the load to a rear frame structure structure. Thereby, the load can be distributed to the side member and the sub-side member. From the above, collision performance can be improved.

Additionally, in the vehicle body structure related to the invention, preferably, the side member has a deformation promoting portion which promotes deformation of the side member at a position ahead of the power unit with respect to the load. The side member easily deforms in a region ahead of the power unit with respect to the load similarly to the sub-side member. Accordingly, deformation of the side member and deformation of the sub-side member are more easily synchronized. This further improves collision performance.

In the vehicle body structure related to the invention, preferably, the sub-side member folds and deforms at a position ahead of the power unit with respect to the load when the load is applied. Deformation of the side member and deformation of the sub-side member are easily synchronized. This further improves collision performance.

A vehicle body structure of the invention includes a pair of side members which extends in the front-and-rear direction of a vehicle; and a pair of sub-side members juxtaposed below the pair of side members, respectively. Here, the side member has a deformation promoting portion which promotes deformation on the front end side with respect to the load, and the sub-side member has a deformation cooperative movement portion which deforms with the deformation of the deformation promoting portion.

According to this vehicle body structure, since the side member has the deformation promoting portion on the front side with respect to the load, the side member can transmit the load rearward after absorbing the load on the front side. Moreover, since the deformation cooperative movement portion of the sub-side member deforms with the deformation of the deformation promoting portion, deformation of the deformation promoting portion of the side member and deformation of the deformation cooperative movement portion of the sub-side member are easily synchronized. Accordingly, the sub-side member can absorb the load efficiently in cooperative movement with the side member. Additionally, the load can be distributed to the side member and the sub-side member. From the above, collision performance can be improved.

In the vehicle body structure related to the invention, preferably, the strength of the sub-side member at the deformation cooperative movement portion is made lower than that of a portion behind the deformation cooperative movement portion with respect to the load. By making the strength of the deformation cooperative movement portion low, the deformation cooperative movement portion can be reliably deformed in synchronization with the deformation promoting portion of the side member. Moreover, the portion whose strength is stronger than the deformation cooperative movement portion can transmit the load rearward. Accordingly, the load can be distributed to the side member and the sub-side member.

In the vehicle body structure related to the invention, preferably, the sub-side member folds and deforms at the deformation cooperative movement portion when the load has acted. Accordingly, deformation of the side member and deformation of the sub-side member are easily synchronized. This further improves collision performance.

In the vehicle body structure related to the invention, preferably, the deformation promoting portion and the deformation cooperative movement portion are arranged at the same position in the front-and-rear direction of the vehicle. Deformation of the deformation promoting portion and deformation of the deformation cooperative movement portion can be more reliably synchronized. This further improves collision performance.

Advantageous Effects of Invention

According to the invention, collision performance can be improved.

BRIEF DESCRIPTION OF DRAWINGS

FIG. 10 is a perspective view showing a sub-side member of a vehicle body structure related to a modification.

DESCRIPTION OF EMBODIMENTS

A preferred embodiment of a vehicle body structure related to the invention will be described below in detail with reference to the drawings.

Figure 1:
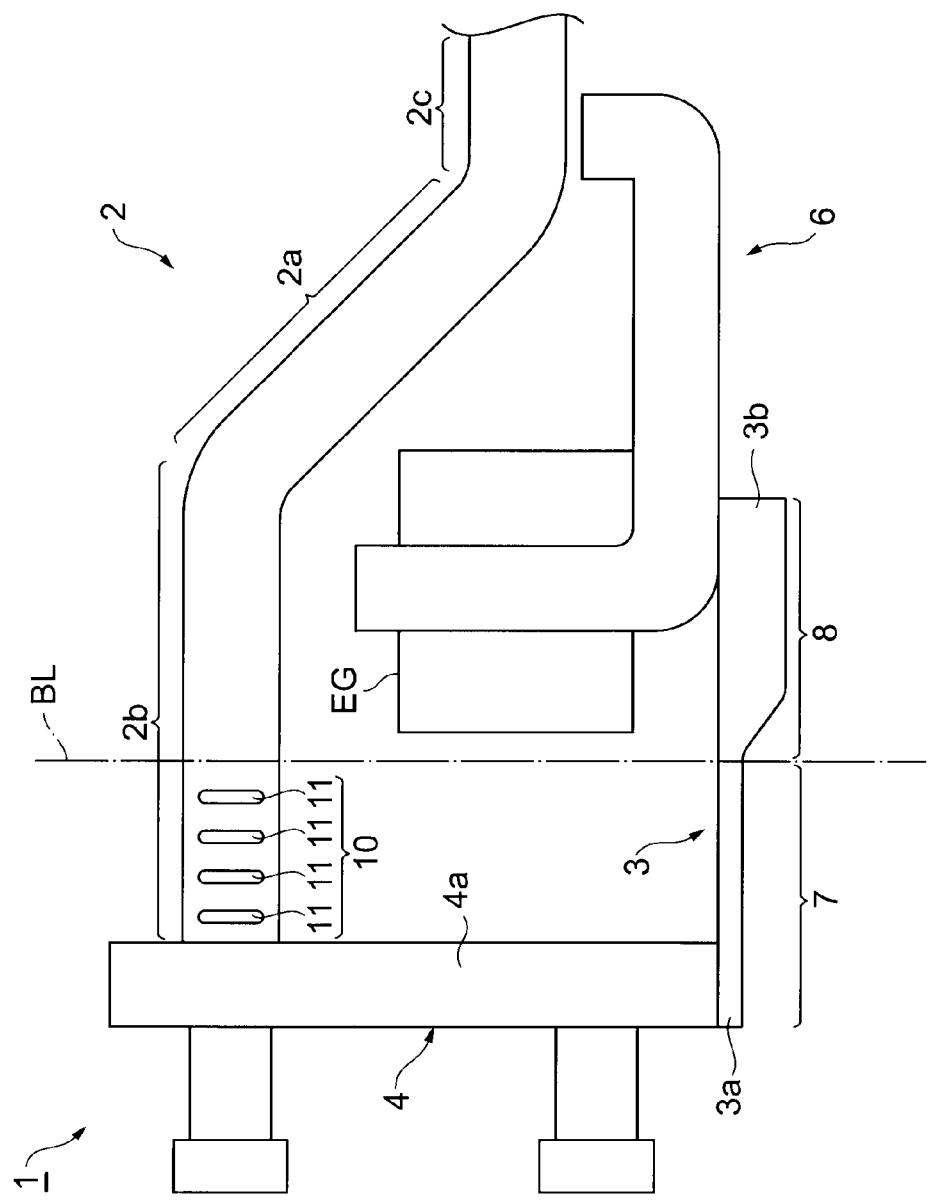
FIG. 1 is a side view of a schematic configuration when a vehicle body structure related to an embodiment of the invention is seen from the vehicle width direction.

FIG. 1 is a side view of a schematic configuration when the vehicle body structure related to the embodiment of the invention is seen from the vehicle width direction. The vehicle body structure 1 is a frame structure on the front side of a vehicle. The vehicle body structure 1 has a function to absorb the load when the load is applied in the front-and-rear direction of the vehicle. As shown in FIG. 1, the vehicle body structure 1 mainly includes front side members 2, sub-side members 3, a radiator support 4, a suspension member 6, and a power unit EG.

The front side members 2 are a pair of frame members which extends in the front-and-rear direction of the vehicle. The front side members 2 are respectively arranged on both sides in the vehicle width direction. The front side members 2 have a function to absorb the load when the load is applied to the front side of the vehicle. Each of the front side members 2 has a kick section 2a which is inclined upward toward the front of the vehicle. Additionally, each of the front side members 2 has a front section 2b which extends in the front-and-rear direction of the vehicle, further to the front than the kick section 2a. Each of the front side members 2 has a rear section 2c which extends in the front-and-rear direction of the vehicle, further to the rear than the kick section 2a. The front sections 2b are arranged at a position higher than the rear sections 2c.

The radiator support 4 is arranged on the front side of the front side members 2 and the sub-side members 3. The radiator support 4 is a member which supports a radiator (not shown). The radiator support 4 has a function to receive the load which acts on the front side of the vehicle. The radiator support 4 has an upper radiator support, a lower radiator support, and a pair of side radiator supports 4a. The upper radiator support extends in the vehicle width direction on the upper side. The lower radiator support extends in the vehicle width direction on the lower side. The side radiator supports 4a extend in the up-and-down direction on both sides in the vehicle width direction. The side radiator supports 4a are coupled to the upper radiator support and the lower radiator support. Each of a pair of side radiator supports 4a is coupled to a front end of the front section 2b of each of the pair of front side members 2.

The suspension member 6 is a member to which a front suspension or the like is assembled. The suspension member 6 is arranged below the front side members 2. In the present embodiment, the suspension member 6 is arranged below the kick sections 2a of the front side members 2.

Each of the sub-side members 3 is a frame member juxtaposed to each of the front side members 2 below each of the front side members 2. Each of the sub-side members 3 extends in the front-and-rear direction of the vehicle so as to be parallel the front section 2b of each of the front side members 2. Each of the sub-side members 3 has a function to absorb the load when the load is applied to the front side of the vehicle. A front end portion 3a of each of the sub-side members 3 is connected to the lower radiator support of the radiator support 4. Additionally, a rear end portion 3b of each of the sub-side members 3 is connected to the suspension member 6. The detailed configuration of the sub-side members 3 will be described below.

The power unit EG is constituted by an engine or the like. The power unit EG is arranged in a region surrounded by the front side members 2, the sub-side members 3, the radiator support 4, and the suspension member 6. The power unit EG is arranged at a position spaced apart at a predetermined interval even from the radiator support 4.

Figure 2:
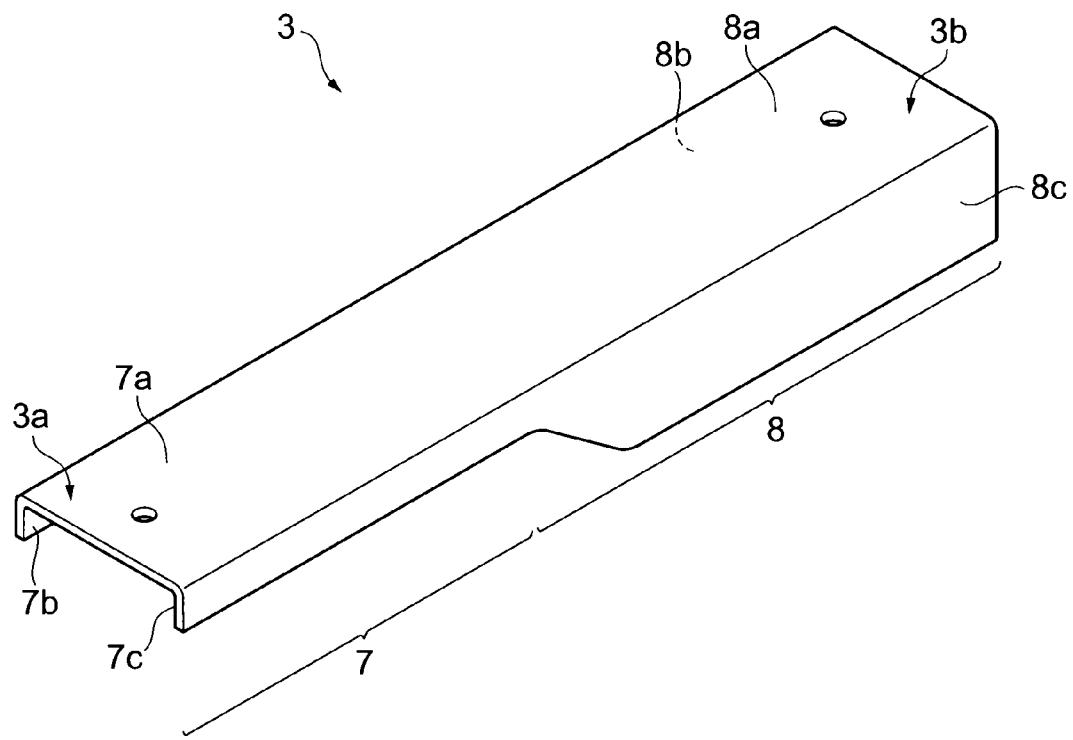
FIG. 2 is a perspective view showing the configuration of a sub-side member of the vehicle body structure related to the embodiment of the invention.

Next, the characteristic configuration of the front side members 2 and the sub-side members 3 of the vehicle body structure 1 related to the present embodiment will be described below in detail with reference to FIGS. 1 and 2. FIG. 2 is a perspective view showing the configuration of the sub-side member 3 of the vehicle body structure 1 related to the present embodiment.

As shown in FIG. 1, each of the front side members 2 has a deformation promoting portion 10 which promotes deformation of the front side member 2 at a position ahead of the power unit EG. The vehicle body structure 1 has a reference position BL which divides a front region of a vehicle to be deformed, and a rear region of the vehicle where deformation is suppressed. The reference position BL is set to a position closer to the front side than a front end of the power unit EG. The deformation promoting portions 10 are set to the front side of the reference position BL. The deformation promoting portions 10 are constituted by a plurality of beads 11 formed at side walls of the front side members 2. The beads 11 are formed by recessing the side walls of the front side members 2 inward or outward. The beads 11 extend in the up-and-down direction of the vehicle. The respective beads 11 are arranged at predetermined intervals in the front-and-rear direction of the vehicle. Deformation of the front side members 2 are promoted by the deformation promoting portions 10 when the load is applied, on the front side of the reference position BL. Thereafter, the front side members 2 suppress deformation and transmit the load rearward, on the rear side of the reference position BL.

As shown in FIG. 1, each of the sub-side members 3 has a deformation cooperative movement portion (portion whose strength is made low) 7 at a position ahead of the power unit EG, and has a deformation suppressing portion (portion on the rear side) 8 on the rear side of the deformation cooperative movement portion 7. The strength of each of the deformation cooperative movement portions 7 is made lower than each of the deformation suppressing portions 8 which is another portion. Each of the deformation cooperative movement portions 7 has a function to deform with the deformation of the deformation promoting portion 10 of each of the front side members 2 when the load is applied. That is, each of the deformation cooperative movement portions 7 has a configuration which is easy to deform without hindering deformation of the deformation promoting portion 10 of each of the front side members 2, when the load is applied. Each of the deformation suppressing portions 8 has a function to suppress deformation when the load is applied.

As shown in FIG. 2, the deformation cooperative movement portion 7 of the sub-side member 3 is constructed so as to have low strength, and the deformation suppressing portion 8 of the sub-side member 3 is constructed so as to have high strength. Specifically, the deformation cooperative movement portion 7 of the sub-side member 3 has an upper wall 7a, a side wall 7b, and a side wall 7c. The deformation suppressing portion 8 of the sub-side member 3 has an upper wall 8a, a side wall 8b, and a side wall 8c.

The upper wall 7a and the upper wall 8a are constituted by one rectangular plate which extends in the front-and-rear direction of the vehicle. The side wall 7b and the side wall 8b extend in the front-and-rear direction of the vehicle. The side wall 7b extends perpendicularly downward from a side end of the upper wall 7a, and the side wall 8b extends perpendicularly downward from the side end of the upper wall 8a. The width of the side wall 7b in the up-and-down direction of the vehicle is smaller than the width of the side wall 8b in the up-and-down direction of the vehicle. At a position where the width between the side wall 7b and the side wall 8b changes, a lower end is inclined toward the front-and-rear direction of the vehicle. The side wall 7c and the side wall 8c extend in the front-and-rear direction of the vehicle. The side wall 7c extends perpendicularly downward from the other side end of the upper wall 7a, and the side wall 8c extends perpendicularly downward from the other side end of the upper wall 8a. The width of the side wall 7c in the up-and-down direction of the vehicle is smaller than the width of the side wall 8c in the up-and-down direction of the vehicle. At a position where the width between the side wall 7c and the side wall 8c changes, a lower end is inclined toward the front-and-rear direction of the vehicle. The shape of the side wall 7b and the side wall 8b and the shape of the side wall 7c and the side wall 8c coincide with each other as seen from the vehicle width direction. Through the above configuration, as for the sub-side member 3, the cross-sectional area of the deformation cooperative movement portion 7 is made smaller than the cross-sectional area of the deformation suppressing portion 8.

The deformation promoting portion 10 of each of the front side members 2 and the deformation cooperative movement portion 7 of each of the sub-side members 3 are arranged at least at a position ahead of the power unit. In the present embodiment, both the deformation promoting portion 10 of each of the front side members 2 and the deformation cooperative movement portion 7 of each of the sub-side members 3 are formed on the front side of the reference position BL. Additionally, it is preferable that the deformation promoting portion 10 of each of the front side members 2 and the deformation cooperative movement portion 7 of each of the sub-side members 3 are arranged at the same position in the front-and-rear direction of the vehicle. Here, the same position does not need strict coincidence of position. The deformation cooperative movement portions 7 only need to be capable of deforming in response to deformation of the deformation promoting portions 10. Accordingly, the rear end position of each of the deformation promoting portions 10 and the rear end position of each of the deformation cooperative movement portions 7 may shift from each other.

Figure 3:
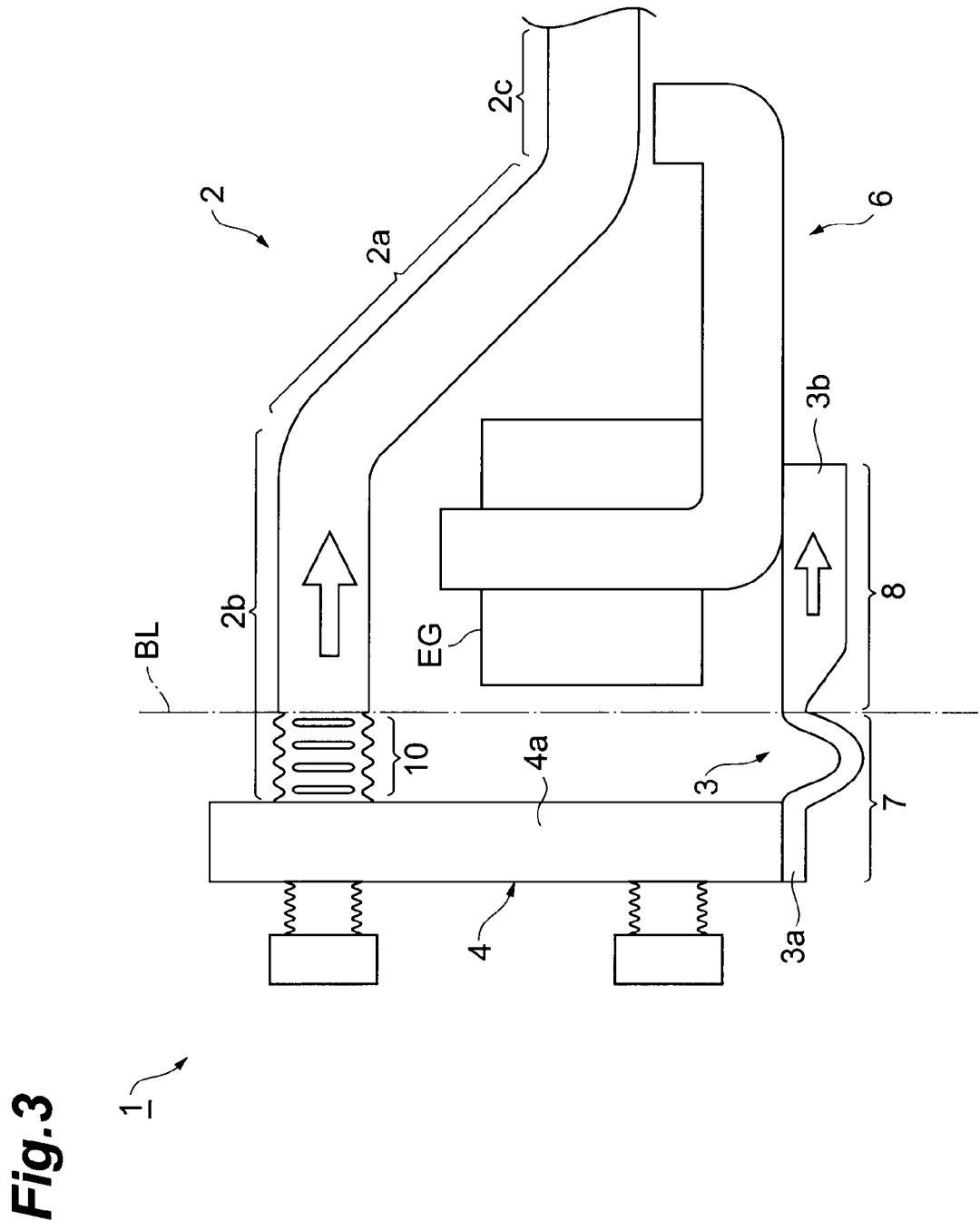
FIG. 3 is a schematic configuration view of the vehicle body structure related to the embodiment of the invention, and is a view showing an aspect when the load is applied to a radiator support.
Figure 4:
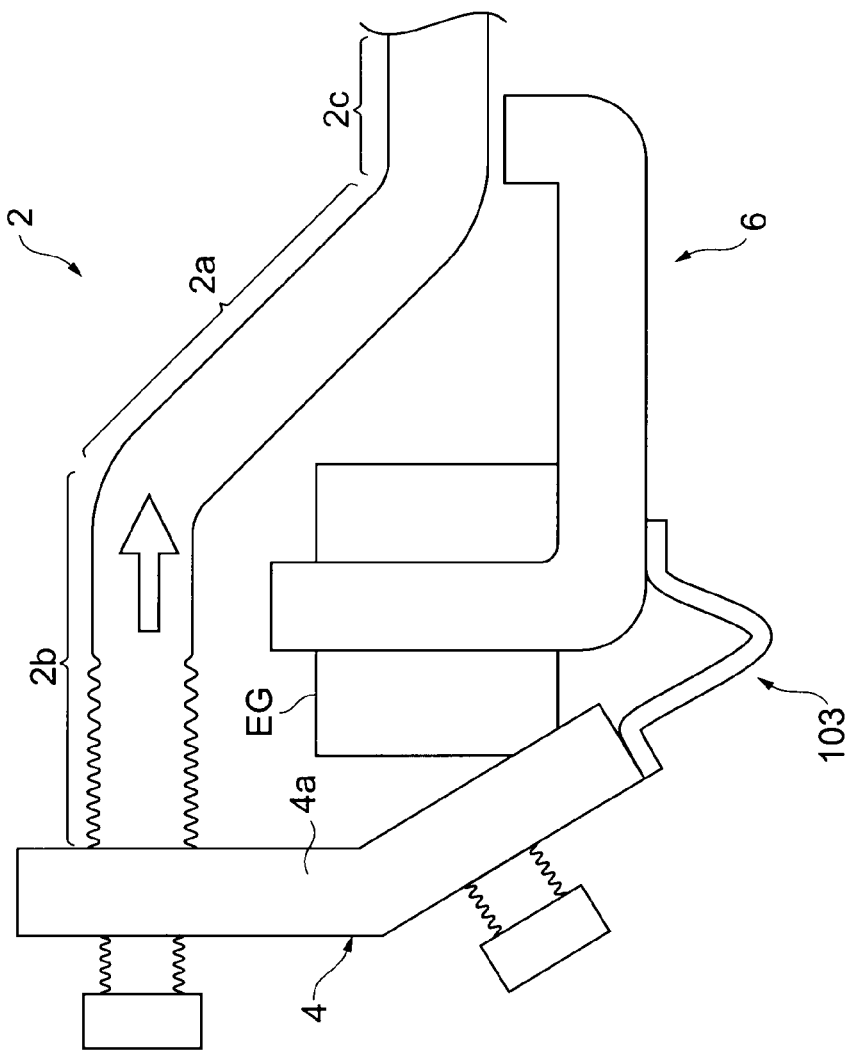
FIG. 4 is a schematic configuration view of a conventional vehicle body structure, and is a view showing an aspect when the load is applied to a radiator support.

Next, working effects of the vehicle body structure 1 related to the present embodiment will be described with reference to FIGS. 3 and 4. FIG. 3 is a schematic configuration view of the vehicle body structure 1 related to the present embodiment, and is a view showing an aspect when the load is applied to the radiator support 4. FIG. 4 is a schematic configuration view of a conventional vehicle body structure 100, and is a view showing an aspect when the load is applied to the radiator support 4.

First, the conventional vehicle body structure 100 includes sub-side members 103 with constant cross-sectional areas as shown in FIG. 4. The sub-side members 103 have constant strength at any position in the front-and-rear direction of the vehicle. Additionally, the deformation promoting portion is not provided on the front side of each of the front side members 2.

In the conventional vehicle body structure 100, buckling folding is generated at a middle position since each of the sub-side members 103 has constant strength. Accordingly, in the radiator support 4, the deformation volume of the lower side of a vehicle body becomes large. Additionally, the front side members 2 and the sub-side members 3 will be greatly different in deformation position or deformation velocity, and a deformation mode is not stable. Additionally, as each of the sub-side members 103 folds at a middle position, the load transmission on the lower side of the vehicle decreases greatly. Accordingly, the load may concentrate on the front side members 2.

On the other hand, as shown in FIGS. 1 and 3, in the vehicle body structure 1 related to the present embodiment, each of the sub-side members 3 has a portion whose strength is made lower than the deformation suppressing portion 8 on the rear side, i.e., a deformation cooperative movement portion 7, at a position ahead of the power unit EG. As described above, each of the sub-side members 103 with constant strength along the front-and-rear direction of the vehicle folds and deforms at the middle position. Each of the sub-side members 3 related to the present embodiment easily deforms at the deformation cooperative movement portion 7 on the front side whose strength is made low. That is, as shown in FIG. 3, each of the sub-side members 3 easily deforms at a position ahead of the power unit EG when the load is applied. The sub-side members 3 can deform in synchronization with the deformation of the front side members 2, in a region ahead of the power unit EG with a relatively small number of disposition parts whose strength are high. Accordingly, the sub-side members 3 can absorb the load efficiently in cooperative movement with the front side members 2. Additionally, each of the sub-side members 3 is constructed so as to have a higher strength than the deformation cooperative movement portion 7, on the rear side of the deformation cooperative movement portion 7. Accordingly, after the load is absorbed by cooperative movement on the front side of the front side members 2 and the sub-side members 3, the sub-side members 3 can sufficiently transmit the load to rear frame structures. Thereby, the load can be distributed to the front side members 2 and the sub-side members 3. From the above, collision performance can be improved.

Additionally, in the vehicle body structure 1 related to the present embodiment, each of the front side members 2 has the deformation promoting portion 10 which promotes deformation of the front side member 2 at a position ahead of the power unit EG. Each of the front side members 2 easily deforms in a region ahead of the power unit EG similarly to the sub-side member 3. Accordingly, deformation of the front side members 2 and deformation of the sub-side members 3 are more easily synchronized. This further improves collision performance.

Additionally, in the vehicle body structure 1 related to the present embodiment, each of the sub-side members 3 is constructed so as to fold and deform at a position ahead of the power unit EG when the load is applied. Accordingly, deformation of the front side members 2 and deformation of the sub-side members 3 are easily synchronized. This further improves collision performance.

Additionally, in the vehicle body structure 1 related to the present embodiment, each of the front side members 2 has the deformation promoting portion 10 which promotes deformation on the front side. Additionally, each of the sub-side members 3 has the deformation cooperative movement portion 7 which deforms with the deformation of the deformation promoting portion 10. Since each the front side members 2 has the deformation promoting portion 10 on the front side, the front side member can transmit the load rearward after absorbing the load on the front side. Moreover, since the deformation cooperative movement portion 7 of each of the sub-side members 3 deforms with the deformation of the deformation promoting portion 10, deformation of the deformation promoting portion 10 of each of the front side members 2 and deformation of the deformation cooperative movement portion 7 of each of the sub-side members 3 are easily synchronized. Accordingly, the sub-side members 3 can absorb the load efficiently in cooperative movement with the front side members 2. Additionally, the load can be distributed to the front side members 2 and the sub-side members 3. From the above, collision performance can be improved.

Additionally, in the vehicle body structure 1 related to the present embodiment, the strength of each of the sub-side members 3 at the deformation cooperative movement portion 7 is made lower than the deformation suppressing portion 8 which is the portion of the vehicle behind the deformation cooperative movement portion 7. By making the strength of the deformation cooperative movement portions 7 low, each of the deformation cooperative movement portions 7 can be reliably deformed in synchronization with the deformation promoting portion 10 of each of the front side members 2. Moreover, the portion whose strength is stronger than the deformation cooperative movement portion 7 can transmit the load rearward. Accordingly, the load can be distributed to the front side members 2 and the sub-side members 3.

Additionally, in the vehicle body structure 1 related to the present embodiment, each of the sub-side members 3 folds and deforms at the deformation cooperative movement portion 7 when the load is applied. Accordingly, deformation of the front side members 2 and deformation of the sub-side members 3 are easily synchronized. This further improves collision performance.

Additionally, in the vehicle body structure 1 related to the present embodiment, the deformation promoting portions 10 and the deformation cooperative movement portions 7 are arranged at the same position in the front-and-rear direction of the vehicle. Accordingly, deformation of the deformation promoting portions 10 and deformation of the deformation cooperative movement portions 7 can be more reliably synchronized. This further improves collision performance.

The invention is not limited to the above-described embodiment. If the sub-side member easily deform on the front side, the shape thereof is not particularly limited. For example, the sub-side member may be a sub-side member shown in FIGS. 5 to 10.

Figure 5:
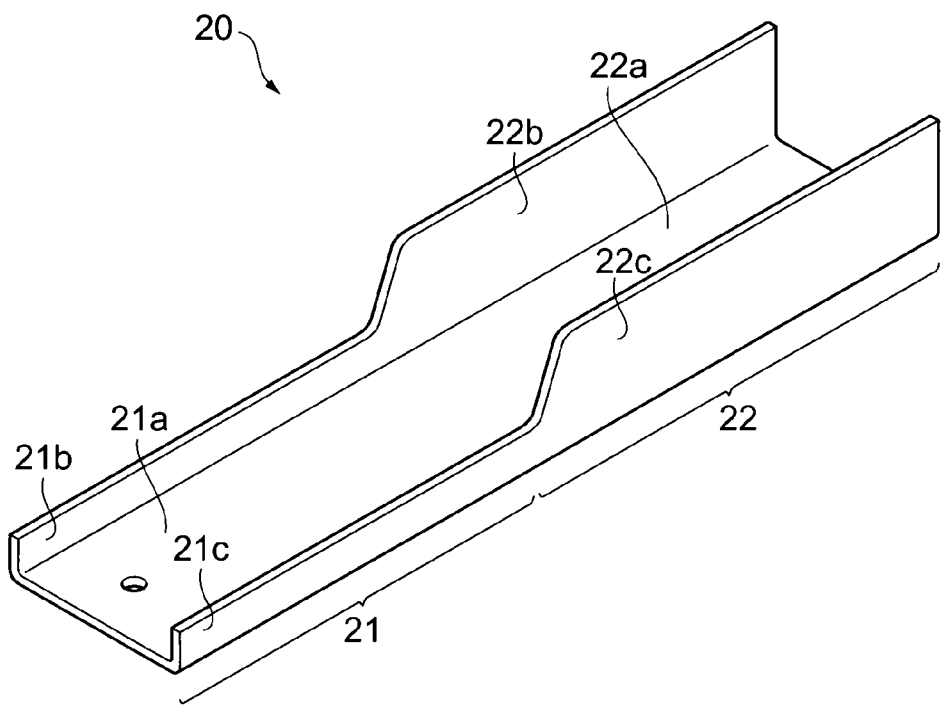
FIG. 5 is a perspective view showing a sub-side member of a vehicle body structure related to a modification.

A sub-side member 20 shown in FIG. 5 has a deformation cooperative movement portion 21 on the front side of the vehicle, and has a deformation suppressing portion 22 on the rear side. The sub-side member 20 has a configuration in which the sub-side member 3 is turned upside down. That is, side walls 21b and 21c of the deformation cooperative movement portion 21 and side walls 21c and 22c of the deformation suppressing portion 22 extend upward.

Figure 6:
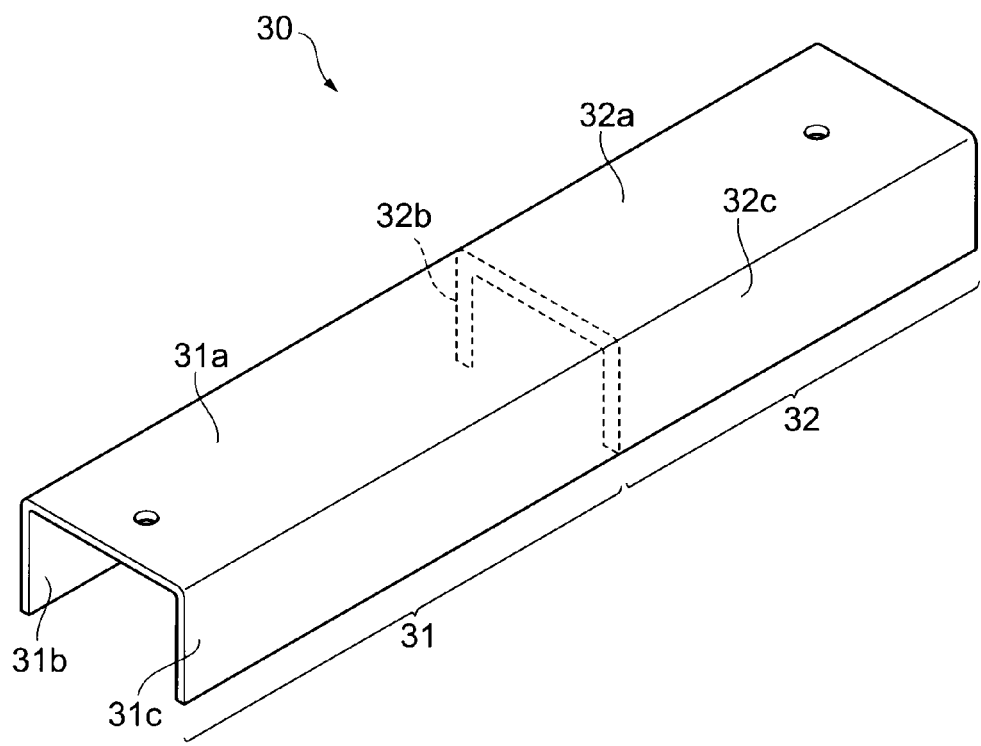
FIG. 6 is a perspective view showing a sub-side member of a vehicle body structure related to a modification.

A sub-side member 30 shown in FIG. 6 has a deformation cooperative movement portion 31 on the front side of the vehicle, and has a deformation suppressing portion 32 on the rear side. An upper wall 31a and side walls 31b and 31c of the deformation cooperative movement portion 31, and an upper wall 32a and the side walls 32b and 32c of the deformation suppressing portion 32 have a constant width. However, the plate thickness of the deformation cooperative movement portion 31 is made smaller than the plate thickness of the deformation suppressing portion 32.

Figure 7:
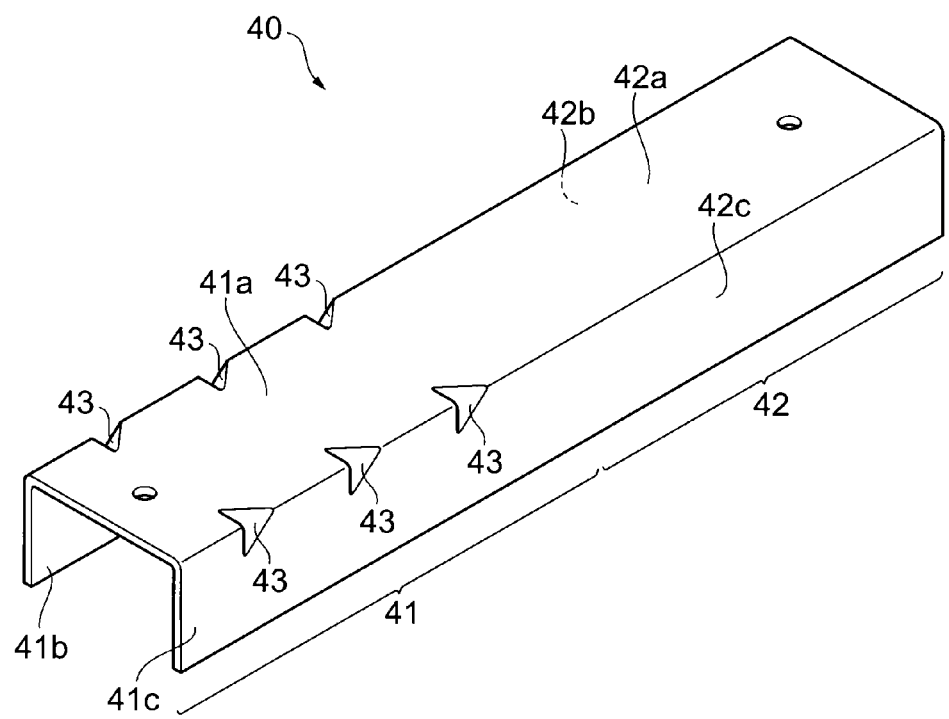
FIG. 7 is a perspective view showing a sub-side member of a vehicle body structure related to a modification.

A sub-side member 40 shown in FIG. 7 has a deformation cooperative movement portion 41 on the front side of the vehicle, and has a deformation suppressing portion 42 on the rear side. The deformation cooperative movement portion 41 has beads 43 between an upper wall 41a and a side wall 41b and between the upper wall 41a and a side wall 41c. The deformation suppressing portion 42 does not have any beads. Since the deformation cooperative movement portion 41 has the beads 43, the deformation cooperative movement portion 41 easily deforms when the load is applied.

Figure 8:
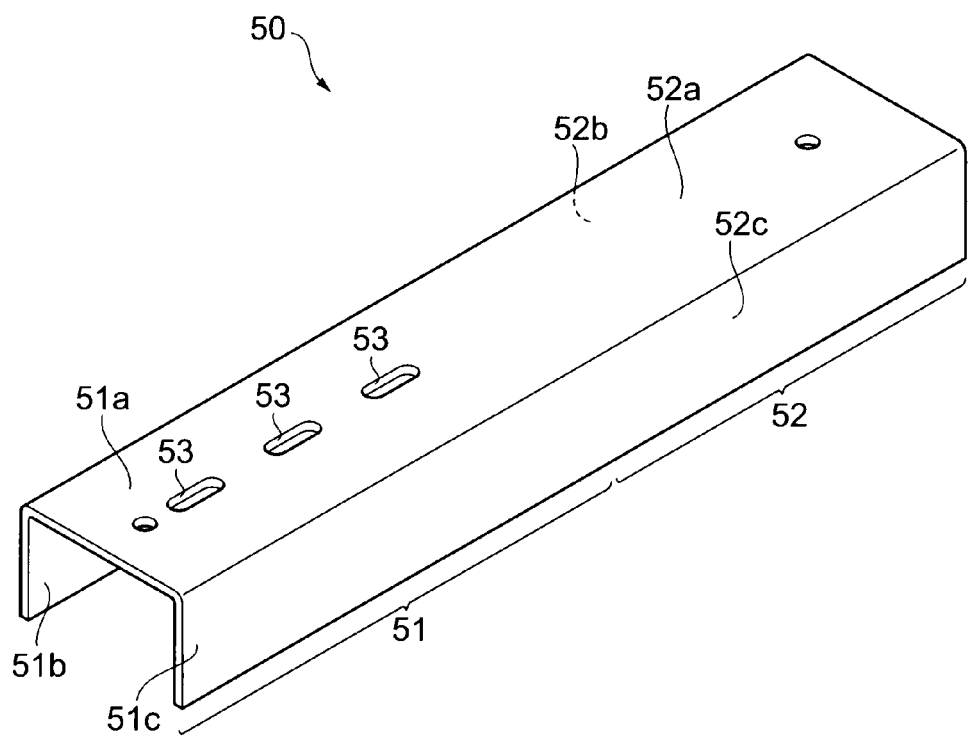
FIG. 8 is a perspective view showing a sub-side member of a vehicle body structure related to a modification.

A sub-side member 50 shown in FIG. 8 has a deformation cooperative movement portion 51 on the front side of the vehicle, and has a deformation suppressing portion 52 on the rear side. An upper wall 51a of the deformation cooperative movement portion 51 is formed with through holes 53. Although the through holes 53 shown in FIG. 8 are long holes which extend in the longitudinal direction of the sub-side member 50, the shape thereof is not limited. For example, the through holes may be long holes which extend in the lateral direction of the sub-side member 50.

Figure 9:
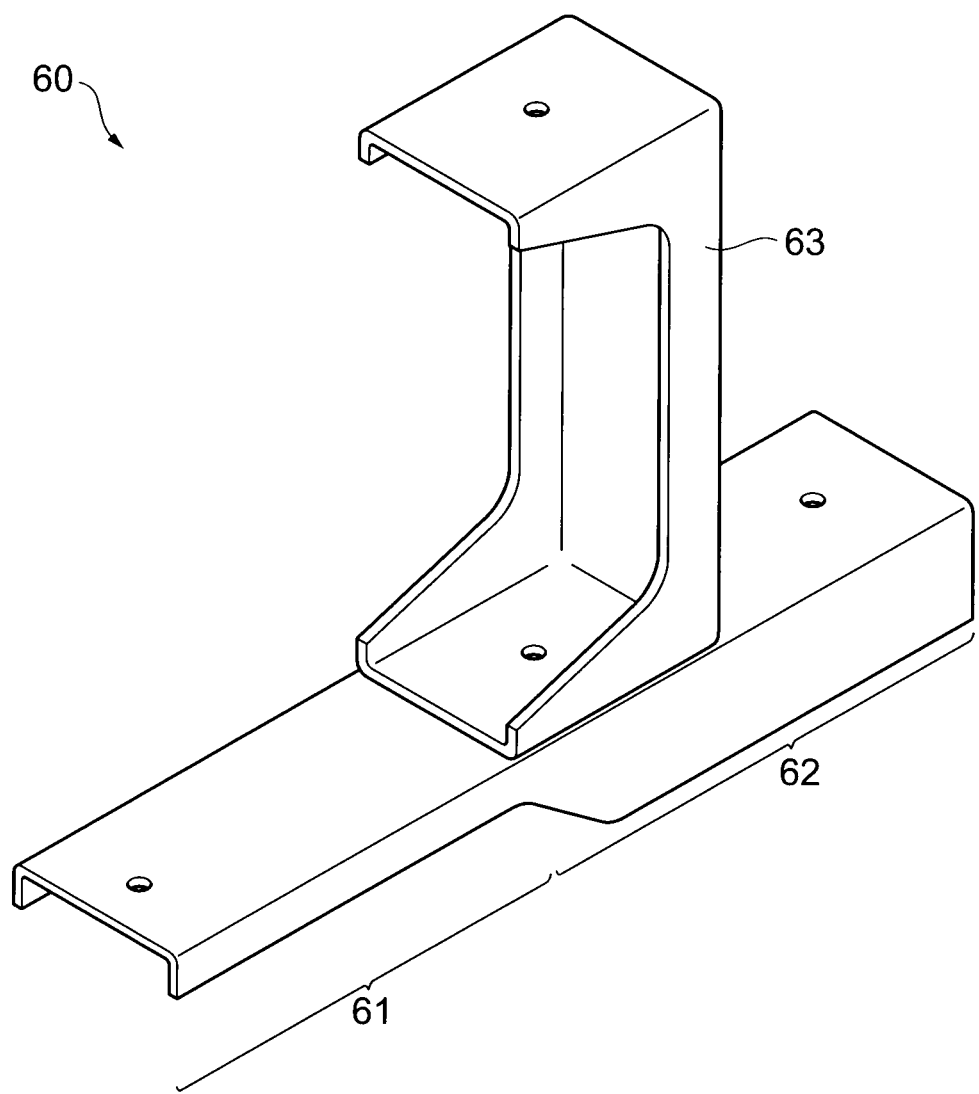
FIG. 9 is a perspective view showing a sub-side member of a vehicle body structure related to a modification.

A sub-side member 60 shown in FIG. 9 has a deformation cooperative movement portion 61 on the front side of the vehicle, and has a deformation suppressing portion 62 on the rear side. The side member 60 is constructed by providing the sub-side member 3 related to the above-described embodiment with a reinforcing member 63. The reinforcing member 63 is arranged between a deformation cooperative movement portion 61 and a deformation suppressing portion 62. The reinforcing member 63 extends upward and is connected to the front side member 2.

A sub-side member 70 shown in FIG. 10 has a deformation cooperative movement portion 71 on the front side of the vehicle, and has a deformation suppressing portion 72 on the rear side. The deformation suppressing portion 72 is constituted by a reinforcing member bent in an L-shape. The reinforcing member extends and is bent toward the front of the vehicle, and extends upward, with its constant cross-section shape maintained. An upper end of the reinforcing member is connected to the front side member 2. The deformation cooperative movement portion 71 is constituted by a member coupled by the deformation suppressing portion 72 and the bent portion.

The vehicle body structure on the front side of the vehicle body has been described in the above-described embodiment. However, the vehicle body structure related to the invention may be applied to any of the front side and the rear side of the vehicle body. In this case, the "front side with respect to the load" indicates the rear end side of the vehicle body.

Industrial Applicability

The invention is applicable when the load which acts on a vehicle is absorbed.

REFERENCE SIGNS LIST

1: VEHICLE BODY STRUCTURE
2: FRONT SIDE MEMBER (SIDE MEMBER)
3: SUB-SIDE MEMBER
7: DEFORMATION COOPERATIVE MOVEMENT PORTION (PORTION WHOSE STRENGTH IS MADE LOW)
8: DEFORMATION SUPPRESSING PORTION (PORTION ON REAR SIDE)
10: DEFORMATION PROMOTING PORTION
EG: POWER UNIT

The invention claimed is:

1. A vehicle body structure comprising:
a pair of side members which extends in a front-and-rear direction of a vehicle;
a pair of sub-side members juxtaposed below the pair of side members, respectively;
a power unit arranged at a position surrounded by the pair of side members and the pair of sub-side members; and
a member which connects a front end portion of the side member and a front end portion of the sub-side member, and extends in an up-and-down direction,
wherein the sub-side member has, at a position ahead of the power unit with respect to load, a portion whose strength is made lower than a portion behind the position,
wherein the side member has a deformation promoting portion which promotes deformation of the side member at a position ahead of the power unit with respect to load,
wherein the member that extends in the up-and-down direction is arranged on the front side of the portion of the sub-side member whose strength is made low and of the deformation promoting portion in the side member,
wherein the sub-side member folds and deforms downward in the portion whose strength is made low at a position ahead of the power unit with respect to load when the load is applied,
wherein the portion whose strength is made lower than the portion behind the position includes an upper wall and two side walls,
wherein the portion behind the position includes an upper wall and two side walls,
wherein both upper walls are constituted by one rectangular plate,
wherein the two side walls extend perpendicularly upward or downward from the respective upper wall on both sides with both the portion whose strength is made lower than the portion behind the position and the portion behind the position,
wherein width of the two side walls of the portion whose strength is made lower than the portion behind the position in the up-and-down direction is smaller than that of the two side walls of the portion behind the position, and
wherein at a location where a small width of the side wall of the portion whose strength is made lower than the portion behind the position and a large width of the side wall of the portion behind the position with respect to load meet, a lower end is inclined toward the front-and-rear direction of the vehicle.

2. The vehicle body structure according to claim 1,
wherein the deformation promoting portion is constituted by a plurality of recessed portions formed at side walls of the side member in one of an inward or outward direction from a plane of the side wall.

3. The vehicle body structure according to claim 2,
wherein each of the plurality of recessed portions are arranged at predetermined intervals in the front-and-rear direction of the vehicle.

4. A vehicle body structure comprising:
a pair of side members which extends in a front-and-rear direction of a vehicle;
a pair of sub-side members juxtaposed below the pair of side members, respectively; and
a member which connects a front end portion of the side member and a front end portion of the sub-side member, and extends in an up-and-down direction,
wherein the side member has a deformation promoting portion which promotes deformation on the front end side with respect to load,
wherein the sub-side member has a deformation cooperative movement portion which deforms with deformation of the deformation promoting portion,
wherein the strength of the sub-side member at the deformation cooperative movement portion is made lower than that of a portion behind of the deformation cooperative movement portion with respect to load,
wherein the member that extends in the up-and-down direction is arranged on the front side of the deformation cooperative movement portion in the sub-side member and of the deformation promoting portion in the side member,
wherein the sub-side member folds and deforms downward at the deformation cooperative movement portion when load is applied,
wherein the deformation cooperative movement portion includes an upper wall and two side walls,
wherein the portion behind of the deformation cooperative movement portion with respect to load includes an upper wall and two side walls,
wherein both upper walls are constituted by one rectangular plate,
wherein the two side walls extend perpendicularly upward or downward from the respective upper wall on both sides with both the deformation cooperative movement portion and the portion behind of the deformation cooperative movement portion with respect to load,
wherein width of the two side walls of the deformation cooperative movement portion in the up-and-down direction is smaller than that of the two side walls of the portion behind of the deformation cooperative movement portion with respect to load, and
wherein at a location where a small width of the side wall of the deformation cooperative movement portion and a large width of the side wall of the portion behind of the deformation cooperative movement portion with respect to load meet, a lower end is inclined toward the front-and-rear direction of the vehicle.

5. The vehicle body structure according to claim 4, wherein the deformation promoting portion and the deformation cooperative movement portion are arranged at the same position in the front-and-rear direction of the vehicle.

6. The vehicle body structure according to claim 4, wherein the deformation promoting portion is constituted by a plurality of recessed portions formed at side walls of the side member in one of an inward or outward direction from a plane of the side wall.

7. The vehicle body structure according to claim 6, wherein each of the plurality of recessed portions are arranged at predetermined intervals in the front-and-rear direction of the vehicle.

8. The vehicle body structure according to claim 4, further comprising:
   a power unit arranged at a position surrounded by the pair of side members and the pair of sub-side members,
   wherein the deformation promoting portion and the deformation cooperative movement portion are arranged at a position ahead of the power unit with respect to load.

* * * * *